US 11,641,150 B2

(12) United States Patent
Kwon

(10) Patent No.: US 11,641,150 B2
(45) Date of Patent: May 2, 2023

(54) SMART GENERATOR

(71) Applicant: O Chan Kwon, Jeju (KR)

(72) Inventor: O Chan Kwon, Jeju (KR)

( * ) Notice: Subject to any disclaimer, the term of this patent is extended or adjusted under 35 U.S.C. 154(b) by 0 days.

(21) Appl. No.: 17/583,555

(22) Filed: Jan. 25, 2022

(65) Prior Publication Data

US 2022/0271636 A1 Aug. 25, 2022

(30) Foreign Application Priority Data

Feb. 25, 2021 (KR) .................. 10-2021-0026493
Dec. 22, 2021 (KR) .................. 10-2021-0184724

(51) Int. Cl.
*H02K 16/04* (2006.01)
*H02K 13/00* (2006.01)

(52) U.S. Cl.
CPC ........... *H02K 16/04* (2013.01); *H02K 13/003* (2013.01)

(58) Field of Classification Search
CPC ........ H02K 13/00; H02K 13/04; H02K 16/00; H02K 16/04; H02K 13/003
USPC .... 310/12.15, 216.025, 216.031, 261.1, 264, 310/268
See application file for complete search history.

(56) References Cited

U.S. PATENT DOCUMENTS

| | | | | |
|---|---|---|---|---|
| 11,509,175 | B1* | 11/2022 | Hsu | H02K 1/16 |
| 2011/0278975 | A1* | 11/2011 | Holcomb | H02K 16/02 |
| | | | | 74/DIG. 9 |
| 2015/0145364 | A1* | 5/2015 | Holcomb | H02K 53/00 |
| | | | | 74/DIG. 9 |
| 2016/0294230 | A1* | 10/2016 | Zhang | H02K 21/44 |
| 2017/0018995 | A1* | 1/2017 | Im | H02K 35/02 |
| 2017/0098989 | A1* | 4/2017 | Kitada | H02K 9/20 |
| 2017/0339752 | A1* | 11/2017 | Yamaguchi | H05B 6/02 |
| 2017/0339753 | A1* | 11/2017 | Yamaguchi | F03D 9/22 |
| 2020/0161939 | A1* | 5/2020 | Takahashi | H02K 3/12 |
| 2020/0185997 | A1* | 6/2020 | Hirasawa | H02K 7/14 |
| 2020/0303973 | A1* | 9/2020 | Kang | H02K 21/22 |
| 2020/0328639 | A1* | 10/2020 | Takahashi | H02K 1/2786 |
| 2020/0328640 | A1* | 10/2020 | Takahashi | H02K 1/12 |
| 2020/0403468 | A1* | 12/2020 | Takahashi | H02K 1/2766 |
| 2021/0140402 | A1* | 5/2021 | Sninsky | F03B 13/264 |
| 2021/0234415 | A1* | 7/2021 | Taniguchi | H02K 1/187 |
| 2021/0265885 | A1* | 8/2021 | Takahashi | H02K 1/2786 |
| 2021/0273511 | A1* | 9/2021 | Takahashi | H02K 1/2786 |
| 2021/0288531 | A1* | 9/2021 | Takahashi | H02K 3/28 |
| 2021/0376701 | A1* | 12/2021 | Fu | H02K 1/148 |
| 2021/0384784 | A1* | 12/2021 | Takahashi | H02K 21/22 |
| 2022/0003089 | A1* | 1/2022 | Artinian | E21B 43/128 |
| 2022/0006339 | A1* | 1/2022 | Takahashi | H02K 13/006 |
| 2022/0181935 | A1* | 6/2022 | Tamura | H02K 3/28 |
| 2022/0200408 | A1* | 6/2022 | Takahashi | H02K 11/0141 |
| 2022/0200421 | A1* | 6/2022 | Takahashi | H02K 1/27915 |

(Continued)

FOREIGN PATENT DOCUMENTS

KR     2020120006841 U     10/2012

*Primary Examiner* — Rashad H Johnson
(74) *Attorney, Agent, or Firm* — Rabin & Berdo, P.C.

(57) ABSTRACT

The present disclosure relates to a smart generator and, more particularly, to a smart generator in which two stators are used for a single rotor, the gap between an N-pole and an S-pole of the first and second stators is decreased, and a load that is an interference electromagnetic force affecting a rotor wire is minimized, whereby more power can be generated from a less force.

3 Claims, 5 Drawing Sheets

(56) References Cited

U.S. PATENT DOCUMENTS

| | | | |
|---|---|---|---|
| 2022/0271636 A1* | 8/2022 | Kwon | H02K 13/003 |
| 2022/0363092 A1* | 11/2022 | Copeland | B60B 11/10 |

* cited by examiner (FOME OF MAGNETIC FORCE LINES IN COMMON GENERATION OF RELATED ART)

SMART GENERATOR

BACKGROUND OF THE INVENTION

Field of the Invention

The present disclosure relates to a smart generator that is designed to generate power from even a small force by minimizing an interference electromagnetic force due to a circular magnetic field when a current flows through a conducting wire of a rotor and that not only reduce energy for power generation, but is not inferior to be used as alternative energy in the future.

Description of the Related Art

In general, power generation is made by a generator including a stator and a rotor.

The force for rotating the rotor of a generator can be obtained in various ways, and for example, heating power, water power, wind power, tidal power, and nuclear power can be used. These power generation types each have advantages and defects.

In particular, any one of these general power generation types may not be suitable for underdeveloped areas or isolated areas. For example, underdeveloped countries may have difficulty in raising funds for constructing a dam or introducing power generation facilities and individual consumers may have difficulty in taking care of a power consumption cost. Further, there is a problem that excessive costs are required to construct not only power generation facilities, but power transmission facilities in order to supply power to the people who live at deserts, high mountains, and islands.

Accordingly, generators that can solve the energy problem because it can replace the fossil fuel and that can be used instead of various types of power plants are developed.

CITATION LIST

Patent Literature

Patent Literature 1: Korean Utility Model Application Publication No. 20-2012-0006841 (published Oct. 5, 2012)

SUMMARY OF THE INVENTION

The present disclosure has been made in an effort to solve the problems described above and an objective of the present disclosure is to provide a smart generator in which first and second stators are used for a stator, they are disposed in a double pipe form, a space between the first and second stators are decreased in comparison to the related art, thereby decreasing the intensity of an interference electromagnetic force and being able to obtain large power from a less force.

Other objects and advantages of the present disclosure will be described below through embodiments of the present disclosure. Further, the objects and advantages of the present disclosure will be achieved by the components described in claims and combinations of the components.

In order to solve the problems, a smart generator includes:
an inner housing having a through-hole at the center thereof and having a cylindrical shape;
a first stator being an S-polar stator formed around the outer surface of the inner housing;
a pipe-shaped outer housing installed outside the inner housing;
a second stator being an N-polar stator formed around the inner surface of the outer housing to correspond to the S-pole of the first stator;
a rotary shaft rotatably inserted in the through-hole;
a rotor support curved and extended at both sides of the outer surface of the rotary shaft toward a space between the first and second stators;
a rotor wire installed longitudinally on the outer surface of the rotor support, positioned between the first and second stators, and rotated between the first and second stators by the rotary shaft so that a current flows;
a collector slip ring integrally formed on the outer surface of an end of the rotary shaft inside the outer housing, and electrically connected to the rotor wire to receive electrical energy; and
a brush fixed on a side of the outer housing in contact with the collector slip ring and transmitting electric energy to an external consumer,
in which the size of the space between the S-pole and the N-pole is minimized through the double pipe-shaped first and second stators, so the range of a circular magnetic field in the space is decreased, whereby the intensity of an interference electromagnetic force that is a load interfering with generation of the circular magnetic field is decreased, and power generation can be increased and improved.

DETAILED DESCRIPTION OF THE PREFERRED EMBODIMENTS

Figure 1:
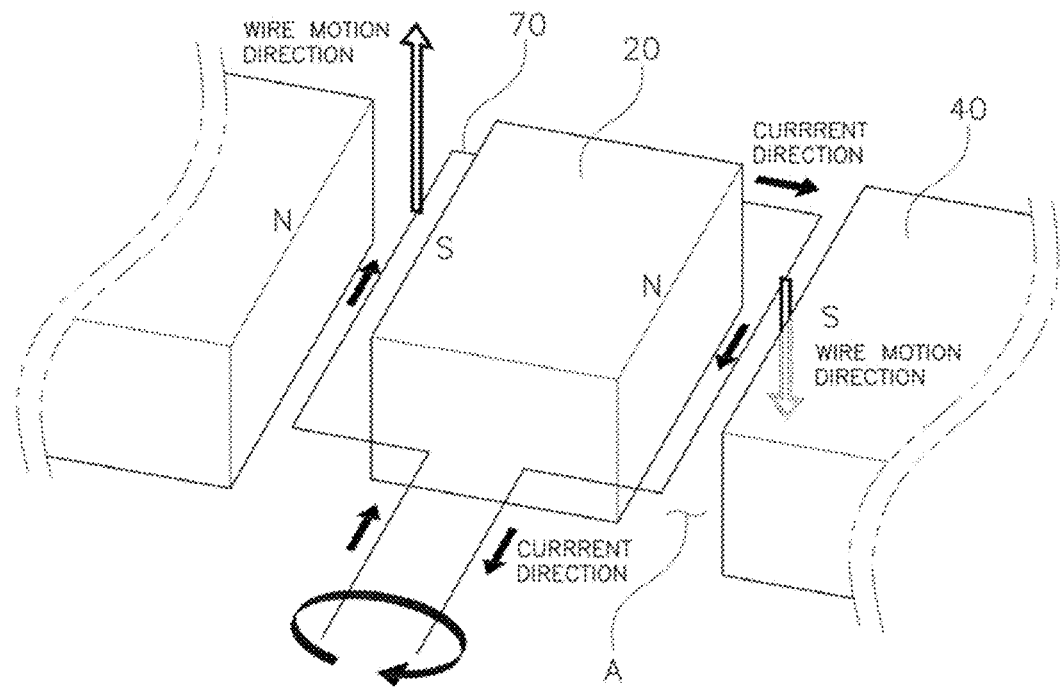
FIG. 1 is a conceptual view showing the power generation principle of a smart generator according to the present disclosure.

Before describing embodiments of the present disclosure in detail, it will be understood that the present disclosure is not limited to the components and arrangements of the components described below and shown in drawings. The present disclosure may be accomplished by other embodiments in various ways. Expressions and predicates stated herein in association with terms such as a device and directional terms (for example, "front", "back", "up", "down", "top", "bottom", "left", "right", and "lateral") are used only for simplifying the following description, and it does not mean that related devices and elements should simply have specific directions. Further, terms such as "first" and "second" are used in the detailed description and claims, but are not intended to mean relative priority or object.

The present disclosure has the following characteristics to achieve the above objects.

Hereinafter, exemplary embodiments of the present disclosure are described in detail with reference to the accompanying drawings. The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Therefore, the configurations described in the embodiments and drawings of the present disclosure are merely most preferable embodiments but do not represent all of the technical spirit of the present disclosure. Thus, it should be understood that the present disclosure should be construed as including all the changes, equivalents, and substitutions included in the spirit and scope of the present disclosure at the time of filing this application.

Hereafter, a smart generator according to an exemplary embodiment of the present disclosure is described in detail with reference to FIGS. 1 to 6.

A smart generator according to the present disclosure is a measure that can replace the fossil fuel at present day with severe energy problems and enables an economic effect to solve even environmental problems by using nonpolluting electric energy for modern power. Further, the smart generator is designed to be able to solve environmental problems with a high economic value, prevent global warming, and solve energy problems by being used for vehicles, ships, or the like instead of a charging battery and an electric vehicle of the related art. The smart generator includes an inner housing 10, a first stator 20, an outer housing 30, a second stator 40, a rotary shaft 50, a rotor support 60, a rotor wire 70, collector slip ring 80, and a brush 90.

The inner housing 10 has a through-hole 11 formed longitudinally through the center thereof and has a housing shape having a cylindrical pipe shape.

The first stator 20 is an S-polar stator formed around the outer surface of the inner housing 10.

The outer housing 30 is a pipe-shaped housing installed outside the inner housing 10, has a double pipe shape with the inner housing 10, and has an empty space at a side therein in which the collector slip ring 80, the brush 90, etc. to be described below can be disposed.

The second stator 40 is an N-polar stator formed around the inner surface of the outer housing 30 to correspond to the S-pole of the first stator 20.

Figure 2:
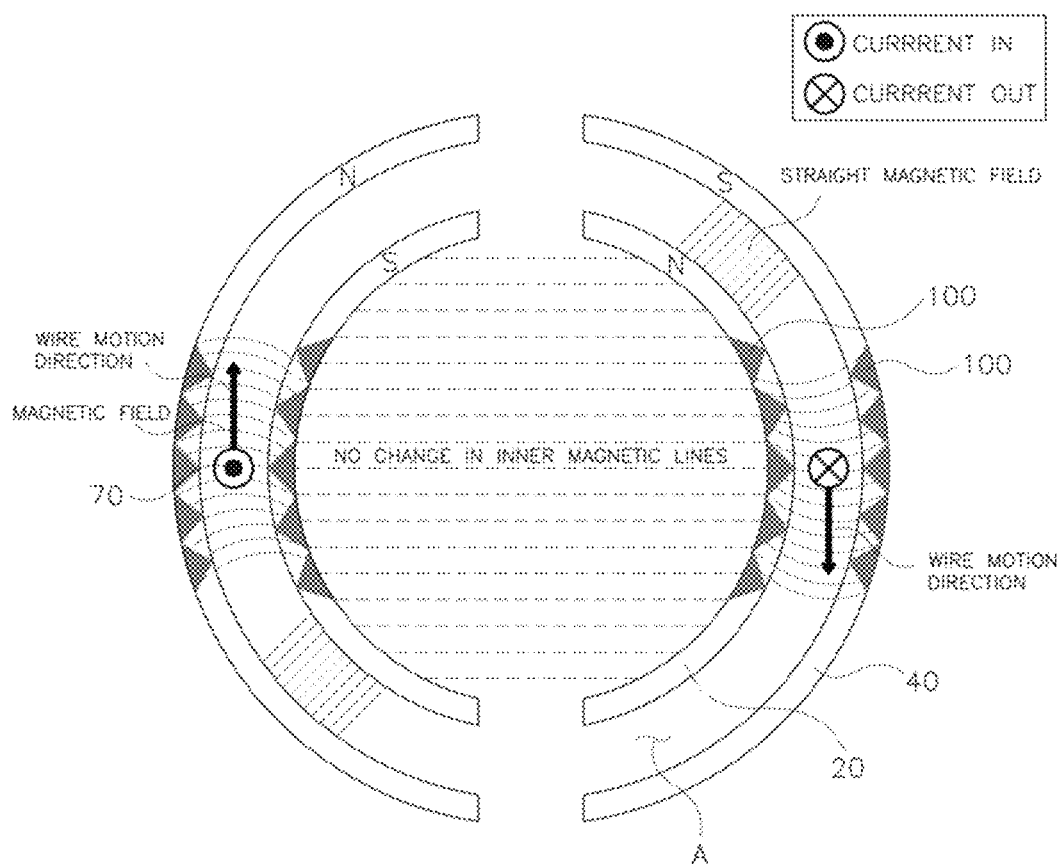
FIG. 2 is a view showing an embodiment of the form of a magnetic field that is generated when a current flows through a rotor wire in the smart generator according to the present disclosure.
Figure 3:
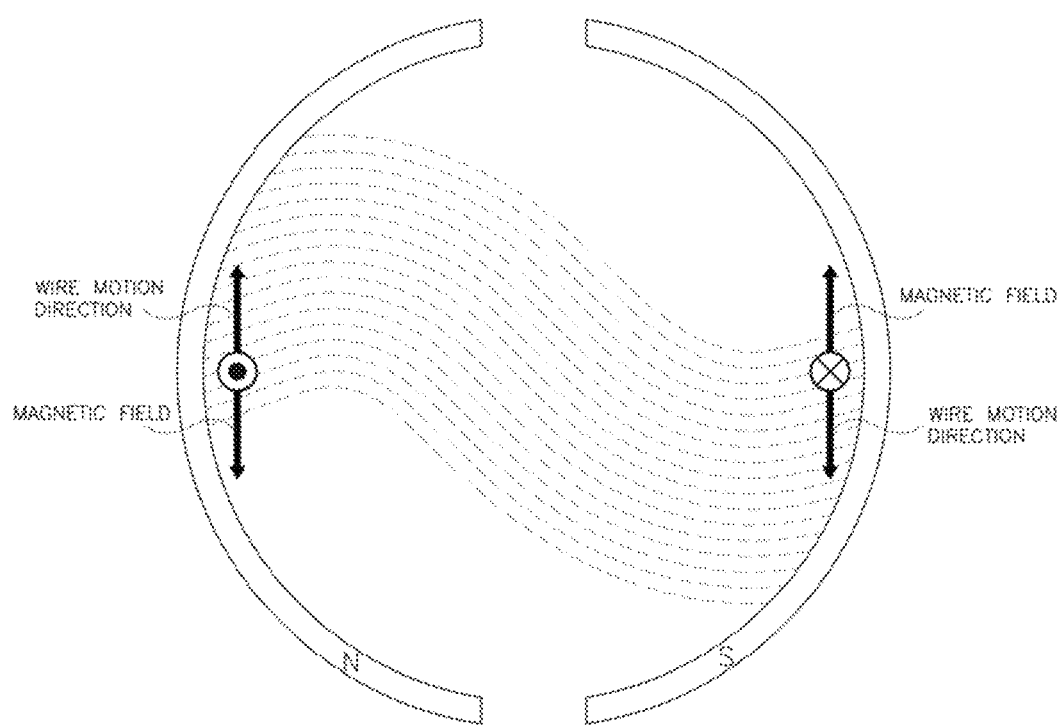
FIG. 3 is a view showing an example of the form of a magnetic field when a current flows so that a generator of the related art generates power.
Figure 4:
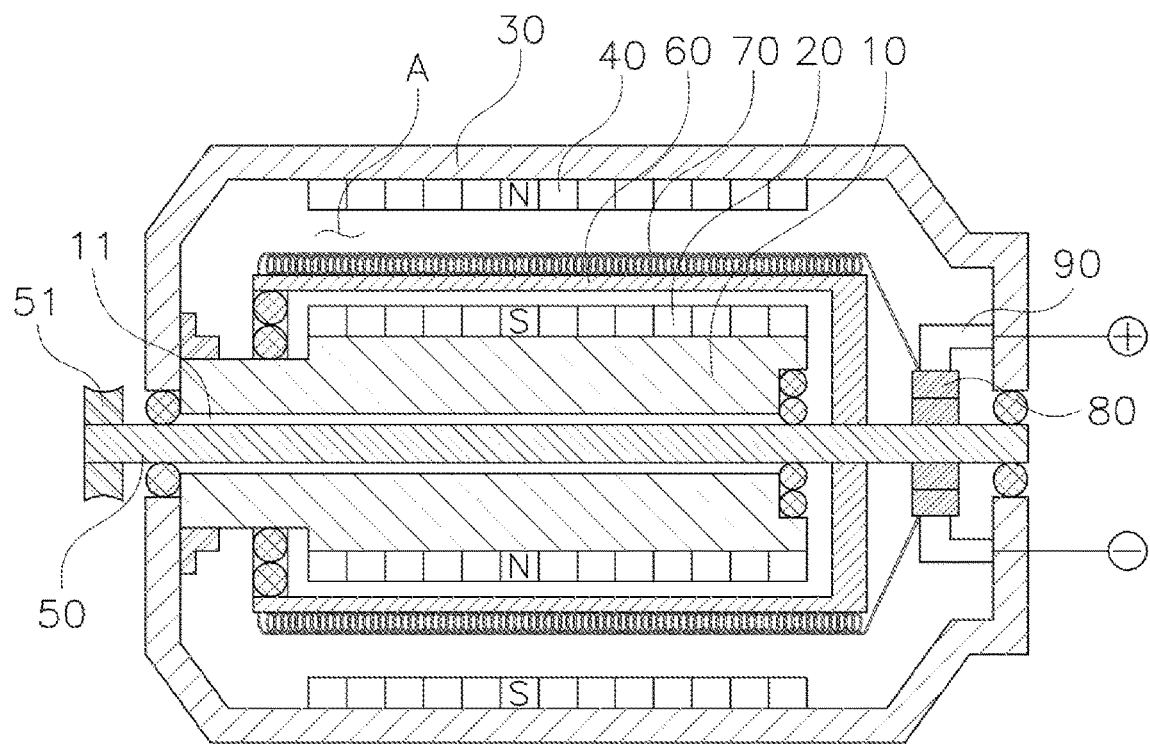
FIG. 4 is a front cross-sectional view of an embodiment showing the smart generator according to the present disclosure.
Figure 5:
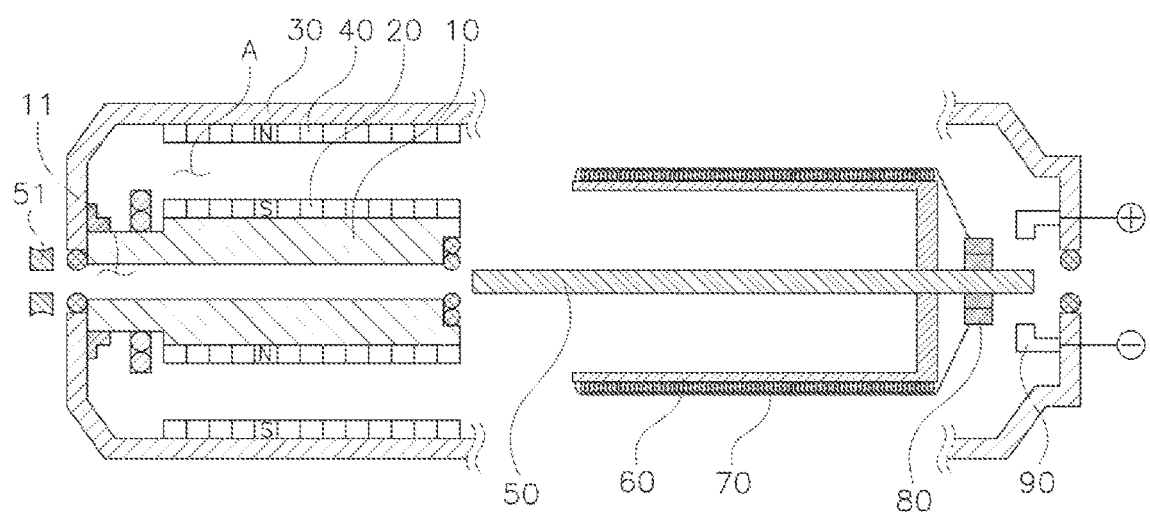
FIG. 5 is an exploded view of FIG. 4.

Of course, as for the first and second stators 20 and 40, the first stator 20 may form an S-pole and the second stator 40 may form an N-pole to correspond to each other, as shown in FIGS. 4 and 5. However, depending on various embodiments by users, as shown in FIG. 2, the first stator 20 may have an N-pole and an S-pole, which are separated from each other, at a first side and a second side of the outer surface of the inner housing 10 and the second stator 40 may also have an S-pole and an N-pole at a first side and a second side of the outer surface of the outer housing 30 to correspond to the N-pole and the S-pole of the first stator 20.

Further, in the present disclosure, depending on embodiments by users, the surfaces of the first and second stators 20 and 40, which correspond to each other in a space A therebetween, may have a common flat plate shape. However, they may have thread-shaped prominences and depressions 100 in the longitudinal direction ('/\/\'-shaped triangles having surfaces at an angle of 45°) so that a magnetic field in the space A has an arc shape curved in the same direction as the rotation direction of the rotor wire 70, thus reducing generation of an interference electromagnetic force. In FIG. 2, the prominences and depressions 100 are formed only at a portion, but they may be formed on the entire of the first and second stators 20 and 40 or may be formed only at a portion, depending on users, and are formed only at a portion for the convenience of showing (that is, a curved magnetic field is generated by the prominences and depressions 100, so it coincides with the circular magnetic field by the current flowing through the rotor wire 70, whereby an interference electromagnetic force is reduced. The reason of giving the surface angle of 45° is for minimizing the gaps between the prominences and depressions. Further, the angle of the prominences and depressions may be changed in various embodiments by users.

In this case, the shape of the semicircular magnetic field generated at the first and second stators 20 and 40 and the shape of the circular magnetic field generated at the rotor wire 70 almost coincide with each other, whereby it is possible to further minimize the interference electromagnetic force due to a straight magnetic field generated at the first and second stators 20 and 40 when the prominences and depressions 100 are not formed (the magnetic field inside the inner housing 10 keeps equilibrium regardless of whether a current flows through the rotor wire 70).

The rotary shaft 50, which is a shaft longitudinally inserted in the through-hole 11 with both ends protruding from both ends of the outer housing 30, is installed to be rotatable in the through-hole 11. It is needless to say that a first end of the rotary shaft 50 may be connected to various external rotation devices through a pulley 51 outside the outer housing 30 to be able to receive torque.

The rotor support 60 is curved and extended in a '¬' shape at both sides of the outer surface of the rotary shaft 50 toward the space A between the first and second stators 20 and 40.

The rotor wire 70 is installed longitudinally on the outer surface of the rotor support 60, is positioned between the first and second stators 20 and 40, and is rotated between the first and second stators 20 and 40 by the rotary shaft 50 so that a current flows.

The collector slip ring 80 is made of metal such as carbon, is integrally formed on the outer surface of an end of the rotary shaft 50 inside the outer housing 30, and is electrically connected to the rotor wire 70 to receive electrical energy. The brush 90 is fixed without rotating on a side of the outer housing 30 in contact with the collector slip ring 80 and transmits electric energy to an external consumer.

According to the smart generator having the configuration described above, as described above, the rotor wire 70 is rotated in one direction by the rotor support 60 and the rotary shaft 50 in the space A between the first and second stators 20 and 40. A magnetic field is formed between the first and second stators 20 and 40. The magnetic field is distorted by rotation of the rotor wire 70, the distorted force generates an induced electromotive force, and a current can flow by the induced electromotive force. It is apparent that the flow direction of a current can be known by applying Fleming's right hand rule well known in the art.

Further, in the configuration of the present disclosure, since two stators are used, the size of the space A between the S-pole and the N-pole is further minimized through the double pipe-shaped first and second stators 20 and 40 in comparison to the gap in existing generators, whereby the range of the circular magnetic field in the space A is decreased. Accordingly, the intensity of an interference electromagnetic force that is shown as a load interfering with generation of the circular magnetic field is decreased, whereby power generation can be increased and improved.

Figure 6:
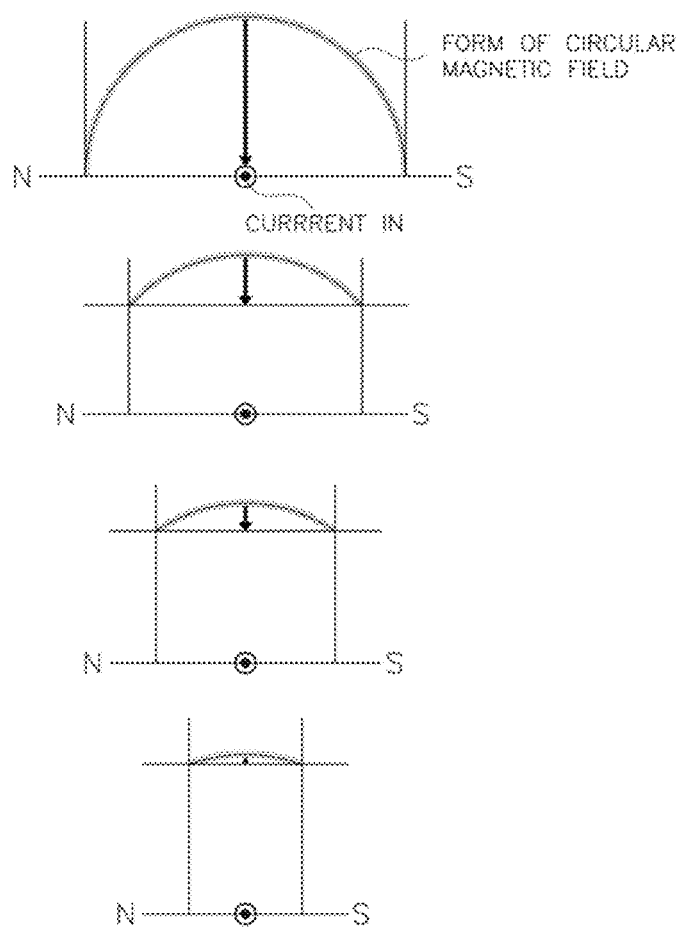
FIG. 6 is a view showing a change of a magnetic field due to the gap between an N-pole and an S-pole.

As can be seen from FIG. 6, it can be seen that as the space between the N-pole and the S-pole is increased, the intensity of a magnetic field is changed although the position of the rotor wire 70 and the intensity of a current are not changed. Therefore, according to the present disclosure, an interference electromagnetic force due to a magnetic field is minimized by minimizing the gap between an N-pole and an S-pole.

As described above, according to the present disclosure, since it is possible to obtain large power from a less force, there is an effect that it is possible to solve not only energy problems, but also environmental problems by replacing an engine with a motor in various power plants such as an electric vehicle, an electric ship, etc.

Further, there is an effect that it is possible to operate a large generator using a small motor connected to a storage battery, charge the storage battery with some of power, and use most power for operating power plants.

Further, there is an effect that it is possible to produce unique alternative energy, which can replace existing fossil fuel, and to solve both of energy and environmental problems by completely removing carbon that is the main factor of severe energy problems and global warming.

Although the present disclosure was described with reference to limited exemplary embodiments and drawings, the present disclosure is not limited thereto and may be changed and modified in various ways within the spirit of the present disclosure and claims described below by those skilled in the art.

What is claimed is:

1. A smart generator comprising:
    an inner housing having a through-hole at the center thereof and having a cylindrical shape;
    a first stator being an S-polar stator formed around the outer surface of the inner housing;
    a pipe-shaped outer housing installed outside the inner housing;
    a second stator being an N-polar stator formed around the inner surface of the outer housing to correspond to the S-pole of the first stator;
    a rotary shaft rotatably inserted in the through-hole;
    a rotor support curved and extended at both sides of the outer surface of the rotary shaft toward a space between the first and second stators;
    a rotor wire installed longitudinally on the outer surface of the rotor support, positioned between the first and second stators, and rotated between the first and second stators by the rotary shaft so that a current flows;
    a collector slip ring integrally formed on the outer surface of an end of the rotary shaft inside the outer housing, and electrically connected to the rotor wire to receive electrical energy; and
    a brush fixed on a side of the outer housing in contact with the collector slip ring and transmitting electric energy to an external consumer,
    wherein the size of the space between the S-pole and the N-pole is minimized through the double pipe-shaped first and second stators, so the range of a circular magnetic field in the space is decreased, whereby the intensity of an interference electromagnetic force that is a load interfering with generation of the circular magnetic field is decreased, and power generation is increased and improved.

2. The smart generator of claim 1, wherein
    the first and second stators have thread-shaped prominences and depressions longitudinally formed on surfaces corresponding to each other in the space, so a magnetic field in the space has an arc shape curved in the same direction as the rotation direction of the rotor wire to reduce generation of an interference electromagnetic force.

3. The smart generator of claim 1, wherein
    the first stator has an N-pole and an S-pole, which are separated from each other, at a first side and a second side of the outer surface of the inner housing and the second stator also has an S-pole and an N-pole at a first side and a second side of the outer surface of the outer housing to correspond to the N-pole and the S-pole of the first stator.

* * * * *